United States Patent [19]
Chan

[11] Patent Number: 5,977,032
[45] Date of Patent: Nov. 2, 1999

[54] ACIDIC SURFACTANT COMPOSITION AND METHOD FOR CLEANING WELLBORE AND FLOWLINE SURFACES USING THE SURFACTANT COMPOSITION

[75] Inventor: Albert F. Chan, Plano, Tex.

[73] Assignee: Atlantic Richfield Company, Los Angeles, Calif.

[21] Appl. No.: 09/161,040

[22] Filed: Sep. 26, 1998

[51] Int. Cl.$^6$ .............................. C09K 7/02; E21B 33/13
[52] U.S. Cl. .......................... 507/211; 507/261; 507/269; 507/927; 507/928; 507/933; 166/293
[58] Field of Search ............................ 510/362; 507/211, 507/261, 269, 927, 928, 933; 166/293

[56] References Cited

U.S. PATENT DOCUMENTS

| | | | |
|---|---|---|---|
| 3,070,162 | 12/1962 | Barnard, Jr. | 166/38 |
| 3,529,666 | 9/1970 | Crowe | 166/300 |
| 3,653,441 | 4/1972 | Tuttle | 166/291 |
| 3,756,319 | 9/1973 | Holm et al. | 166/304 |
| 3,884,302 | 5/1975 | Messenger | 166/291 |
| 4,423,781 | 1/1984 | Thomas | 166/312 |
| 4,528,106 | 7/1985 | Grolitzer | 252/8.55 D |
| 4,565,647 | 1/1986 | Llenadeo | 252/354 |
| 4,648,453 | 3/1987 | Nagra et al. | 166/281 |
| 4,681,164 | 7/1987 | Stacks | 166/304 |
| 4,856,589 | 8/1989 | Kuhlman et al. | 507/211 |
| 4,985,154 | 1/1991 | Balzer et al. | 507/211 |
| 5,030,366 | 7/1991 | Wilson et al. | 252/8.551 |
| 5,164,116 | 11/1992 | Berkhof et al. | 252/331 |
| 5,221,343 | 6/1993 | Grauer et al. | 106/729 |
| 5,374,361 | 12/1994 | Chan | 507/211 |
| 5,458,197 | 10/1995 | Chan | 166/304 |
| 5,466,746 | 11/1995 | Geck et al. | 524/837 |
| 5,627,144 | 5/1997 | Urfer et al. | 507/211 |
| 5,830,831 | 11/1998 | Chan et al. | 507/211 |

OTHER PUBLICATIONS

U.S. application No. 08/666,031, Carpenter et al., filed Jun. 19, 1996.

U.S. application No. 08/666,783, Carpenter et al., filed Jun. 19, 1966.

U.S. application No. 08/987,726, Chan et al., filed Dec. 9, 1997.

U.S. application No. 08/987,844, Chan et al., filed Dec. 9, 1997.

U.S. application No. 09/023,379, Chan et al., filed Feb. 13, 1998.

U.S. application No. 09/023,521, Chan et al., filed. Feb. 13, 1998.

U.S. application No. 09/023,909, Chan et al., filed Feb. 13, 1998.

U.S. application No. 09/023,916, Chan et al., filed Feb. 13, 1998.

U.S. application No. 09/023,040, Chan, filed Sep. 25, 1998.

"Interfacial Tensions and Solubilizing Ability of a Microemulsion Phase That Coexists With Oil and Brine", *Journal of Colloid and Interface Science*, vol. 71, No. 2, Sep. 1979.

SPE 25181 "Surfactants; Additives to Improve the Performance Properties of Cements" by K.M. Cowan, Shell Development Co., and Larry Eoff, Halliburton Services, Society of Petroleum Engineers, Inc., 1993.

"Product Line of Sugar Lipids", *SIMULSOL\* SL*, SEPPIC, Inc., 30, Two Bridges Road, Suite 225, Fairfield, New Jersey 07006, U.S.A.

"Alkyl Polglycosides—Technology, Properties and Applications", Edited by K. Hill, W. von Rybinski and G. Stoll; VCH Verlagsgesellschaft mbH, D–69451 Weinheim (Federal Republic of Germany), 1997; pp. 11–12.

*Primary Examiner*—Necholus Ogden
*Attorney, Agent, or Firm*—F. Lindsey Scott

[57] ABSTRACT

A method and composition for removing deposits of heavy hydrocarbonaceous materials and finely divided inorganic particulate matter from wellbore and flowline surfaces using a composition containing an alkyl polyglycoside, an ethoxylated alcohol, an acid and an alkyl alcohol.

10 Claims, 4 Drawing Sheets

2(a)  2(b)  2(c)  2(d)

ACIDIC SURFACTANT COMPOSITION AND METHOD FOR CLEANING WELLBORE AND FLOWLINE SURFACES USING THE SURFACTANT COMPOSITION

BACKGROUND OF THE INVENTION

1. Field of the Invention

This invention relates to the removal of deposits comprising heavy hydrocarbonaceous materials and finely divided inorganic solids from well surfaces, such as the inside of piping such as well tubing or casing, screens and the near wellbore formation, using an acidic alkyl polyglycoside surfactant composition.

2. Background of the Invention

Mixtures of oil, gas and water are frequently produced from oil fields. Processes for treating such mixtures to produce separate streams of oil, gas and water are well known. Typically the oil is separated and recovered as a product; the gas may be separated and recovered as a product; or, alternatively, the gas may be injected into a gas cap above an oil-bearing zone, into an oil-bearing zone or the like as recovered or as a miscible injectant which comprises the produced gas adjusted by the addition of nitrogen, carbon dioxide, hydrocarbons containing from one to about five carbon atoms and the like to adjust the specific gravity of the gas to produce the miscible injectant. The water may be recovered for injection or disposal by other means as known to those skilled in the art. The separation is frequently accomplished in large settling tanks where the oil, gas and water are allowed to gravimetrically separate.

In many instances, the mixture of oil, gas and water is passed to central processing facilities for separation with the oil being recovered as a product and with the gas being either wholly or partially recovered as a product also. In some instances, the gas is distributed to injection wells and injected; and, in some fields, the water is similarly recovered, passed to injection wells and injected into the formation for the disposal of the water, for secondary oil recovery and the like.

It has been found, when such operations are conducted, especially when corrosion inhibitors are used in the lines leading from the wells to the central processing facility and the like, that, over a period of time, deposits of heavy hydrocarbonaceous materials and finely divided inorganic solids deposit on the inner surfaces of the water, and water and gas, injection well tubing and casing, in the near wellbore formation, in the settling tanks and the like. These deposits typically comprise finely-divided inorganic particles such as produced solids which may include hydraulic fracturing proppant, formation sand, formation fines and precipitates of materials such as iron sulfide, carbonates such as limestone and the like. These particles become coated with corrosion inhibitor or other surfactant materials and subsequently accumulate additional quantities of heavy hydrocarbonaceous material in the flowlines, settling tank and the like. These deposits are difficultly removed from any surface and particularly from the inner surfaces of wells, the near wellbore formation and the like. The deposits are detrimental to continued operations in wells for a number of reasons. It has been found that they shelter bacteria which generate corrosive sulfides and other compounds beneath the deposits and in contact with the pipe. This results in accelerated corrosion of the pipe surfaces, the formation of pits and eventual failure of the pipe. The replacement of pipe is expensive. Such deposits may be partially removed with organic solvents such as mixtures of diesel oil and xylene, but such solvents do not dissolve the particulates and accordingly are not effective to remove heavy deposits. Such deposits in wells are particularly common in wells which are used for alternating water and gas injection and in zones of restricted flow in production wells such as gravel packs and the like.

Such deposits may also plug production wells. The deposits in production wells may be formed by a combination of production treatment chemicals, such as scale inhibitors or corrosion inhibitors, oil and finely divided particles which may be produced with fluids from a producing formation or otherwise present in the wellbore. The deposits in producing wells may plug or reduce the flow through the near wellbore formation, gravel packs and the like.

In view of the difficulties created by these deposits, a continuing search has been directed to the development of a composition and a method for the removal of such deposits.

SUMMARY OF THE INVENTION

According to the present invention, it has been found that such deposits can be effectively removed by the use of an acidic alkyl polyglycoside surfactant composition (the aqueous surfactant composition) consisting essentially of an aqueous solution containing from about 0.25 to about 10.0 weight percent of an alkyl polyglycoside surfactant selected from alkyl polyglycosides containing alkyl groups containing from about 9 to about 16 carbon atoms and mixtures thereof; from about 0.25 to about 10.0 weight percent of an ethoxylated alcohol selected from the group consisting of ethoxylated alkyl alcohols containing from about 6 to about 16 carbon atoms in the alkyl alcohol and from about 2.5 to about 6 ethylene oxide groups and mixtures thereof, an acidic material consisting of about 1.0 to about 30.0 weight percent of an organic acid selected from the group consisting of acetic, formic, propionic and citric acids or about 0.5 to about 15.0 weight percent of hydrochloric acid and, from about 0.1 to about 6.0 weight percent of at least one alkyl alcohol containing from about 4 to about 8 carbon atoms. The alkyl polyglycoside surfactant has a DP number from about 1.3 to about 1.8.

The present invention further comprises a method for removing deposits comprising heavy hydrocarbonaceous materials and finely divided inorganic particulate materials from a well by injecting the aqueous surfactant composition into the well, retaining the aqueous surfactant composition in the well for a selected time period, and thereafter injecting the aqueous surfactant solution into a formation penetrated by the well.

The present invention also comprises a method for removing deposits comprising heavy hydrocarbonaceous materials and finely divided inorganic materials by injecting the aqueous surfactant composition into the well, retaining the aqueous surfactant composition in the well for a selected time period and thereafter producing the aqueous surfactant composition from the well.

An inert gas may be used in the methods for removing deposits to produce an aqueous surfactant foam by mixing the aqueous surfactant and an inert gas in an injection tubing or in-situ in the well.

DESCRIPTION OF PREFERRED EMBODIMENTS

Figure 1:
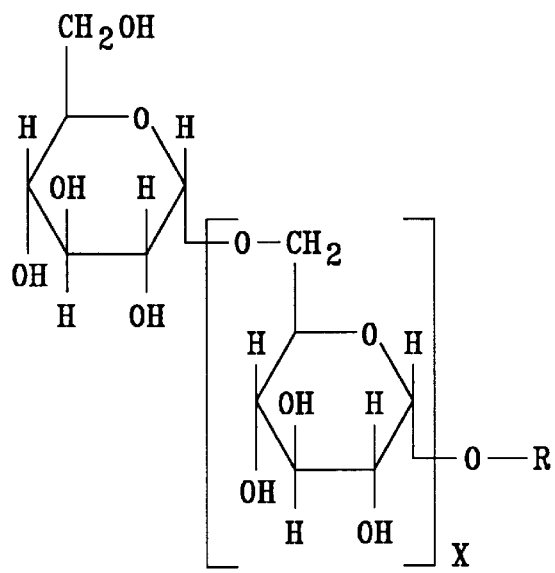
FIG. 1 is a diagram of the molecular structure of an alkyl polyglycoside.

In the discussion of the FIGS., various pumps, valves and the like necessary to achieve the flows described have not been shown in the interest of conciseness. All concentrations are by weight percent of active ingredient in the aqueous solution unless otherwise stated.

The surfactant composition of the present invention consists essentially of an aqueous solution containing from about 0.25 to about 10.0 weight percent, and preferably from about 0.5 to about 2.0 weight percent, of an alkyl polyglycoside surfactant selected from alkyl polyglycosides containing alkyl groups containing from about 9 to about 16 carbon atoms and mixtures thereof; from about 0.25 to about 10.0 weight percent, and preferably from about 0.25 to about 2.0 weight percent, of an ethoxylated alcohol selected from the group consisting of ethoxylated alkyl alcohols containing from about 6 to about 16 carbon atoms in the alkyl alcohol and from about 2.5 to about 6 ethylene oxide groups and mixtures thereof, an acidic material consisting of about 1.0 to about 30.0 weight percent, and preferably from about 5.0 to about 20.0 weight percent, of an organic acid selected from the group consisting of acetic, formic, propionic and citric acids or about 0.5 to about 15.0 weight percent, and preferably from about 3.0 .0 to about 10.0 weight percent, of hydrochloric acid; and, from about 0.1 to about 6.0 weight percent, and preferably from about 0.1 to about 1.0 weight percent, of at least one alkyl alcohol containing from about 4 to about 8 carbon atoms. Preferably, the alkyl polyglycoside, ethoxylated alcohol, and alkyl alcohol comprise from about 0.5 to about 6.0 weight percent of the aqueous solution. Desirably, the alkyl polyglycoside surfactant has a DP number from about 1.3 to about 1.80. The DP number is a measure of the degree of polymerization of the alkyl polyglycoside as defined in *Alkyl Polyglycosides: Technology, Properties and Applications*, edited by Karlheinz Hill, Wolfgang Von Rybinski and Gerhard Stoll, VCH Verlagegesellschaft Mbh, Weinhein (Federal Republic of Germany) and VCH Publishers Inc., New York, N.Y. 1997, pp 11–12.

The alkyl polyglycoside surfactant may comprise a first surfactant consisting essentially of an alkyl polyglycoside selected from the group consisting of alkyl polyglycosides containing alkyl groups containing an odd number of carbon atoms from about 9 to about 13 carbon atoms and mixtures thereof, and having an oligomer distribution from 1 to 12, and a second surfactant consisting essentially of alkyl polyglycosides selected from the group consisting of alkyl polyglycosides containing alkyl groups, a major portion of which are even numbered alkyl groups which contain from about 12 to about 16 carbon atoms and having an oligomer distribution from 1 to 12. Desirably, the alkyl polyglycoside surfactant contains from about 20 to about 90 mole percent of the first surfactant.

The second surfactant may also contain alkyl polyglycosides containing alkyl groups containing odd numbers of carbon atoms from about 9 to about 13 carbon atoms.

The even numbered alkyl groups are representative of naturally occurring linear alkyl groups and tend to have a higher pour point and are less convenient to use as surfactants in wellbore operations and the like. Such surfactants are much more viscous and tend to gel at lower temperatures and are otherwise more difficult to handle than the corresponding alkyl polyglycosides containing alkyl groups containing an odd number of carbon atoms. The alkyl groups containing odd numbers of carbon atoms are representative of refinery product streams containing branched alkyl groups and are not naturally occurring.

The ethoxylated alkyl alcohol may be selected from ethoxylated linear alkyl alcohols, branched alkyl alcohols, Guerbet alcohols, mixtures thereof, and the like. Preferably, the ethoxylated alkyl alcohols contain from about 8 to about 14 carbon atoms and from about 2 to about 6 ethylene oxide groups.

The acid material may be either an organic acid or a mixture of organic acids or hydrochloric acid or mixtures thereof. The acid is typically added as a concentrated aqueous solution. The acid material is a necessary component of the surfactant composition since it is required in combination with the alkyl polyglycosides, the ethoxylated alcohol and alkyl alcohol to effectively dissolve and remove the deposits. Especially with carbonate particulates, the acid is effective to dissolve or break-up the particulates and may generate gas bubbles to further assist in dispersing the deposits.

The alkyl alcohol may be a linear or branched alkyl alcohol. The alcohol facilitates mixing and aqueous surfactant composition stability and promotes the formation of microemulsions.

While the aqueous surfactant compositions may be used at substantially any temperature between their freezing points and their boiling points, it is preferred that they be used at temperatures above about 120° F. At lower temperatures, longer contact times may be required to remove the deposits.

The aqueous surfactant composition functions as an acidic cleaner which solubilizes and disperses the deposits by suspending them in the aqueous surfactant composition in such a fine state that the aqueous surfactant composition and suspended deposits can be injected directly into subterranean formations without damage to the formation. The injection of the aqueous surfactant composition into subterranean formations is considered to increase the injectivity or productivity of such formations.

Alkyl polyglycoside surfactants consist of a polar glucose head and an organic carbon chain off of the hemiacetal linkage. A representation of the molecule is shown in FIG. 1. There are two ether oxygens and three hydroxyl groups per glucose unit, plus a terminal hydroxyl group. The lipophilic portion of the molecule resides in the alkyl chain R. R can be a linear or branched alkyl group containing from about 8 to about 18 carbon atoms or a Guerbet alkyl containing from about 9 to about 19 carbon atoms. The polymerization reaction can provide oligomer distributions from 1 to 12 (i.e. x=0 to x=11).

Figure 2:
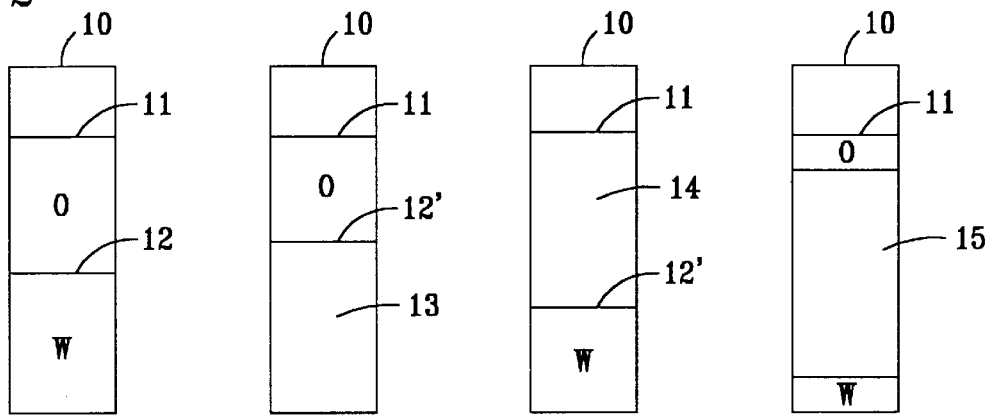
FIG. 2 shows four oil/water systems including Type I, Type II and Type III microemulsions.

In the use of the surfactant composition, it is desirable that the ratio of components be adjusted by testing with the deposits to be removed to form a Type III microemulsion in the wellbore. Such microemulsions are referred to as Windsor Type III or middle phase microemulsions and are described in some detail in "Micellization, Solubilization and Microemulsions", Vol. 2, K. L. Mittal, Plenum Press, New York, 1977. In FIG. 2, Type I, Type II and Type III microemulsions are shown. FIG. 2(a) shows oil (o) and water (w) containing surfactants in a container 10 to a level 11 and having an interface 12. In FIG. 2(b), a Type I microemulsion 13, which is an oil-in-water microemulsion, is shown below an excess oil layer (o). Such microemulsions are water soluble and contain quantities of solubilized oil, as shown by the level of the new interface 12' which is above the original interface 12. In FIG. 2(c), a Type II microemulsion 14, which is a water-in-oil microemulsion, is shown above an excess water layer (w). Such microemulsions are oil soluble and contain quantities of solubilized water as shown by the level of new interface 12' which is below the original interface 12. FIG. 2(d) shows a Type III microemulsion 15, which is located between the excess oil (o) and excess water (w) phases and extends above and below original interface 12. Such Type III microemulsions are preferred for wellbore cleaning operations since their interfacial tensions and solubilization properties toward both oil and water can greatly facilitate the removal of both from wellbores, pipes or other surfaces. Since it is desirable that the deposits be solubilized and dispersed in the aqueous surfactant, it is desirable that the aqueous surfactant be formulated to produce a Type III microemulsion in the wellbore or pipe. Such microemulsions are much more effective in dissolving hydrocarbonaceous materials in the presence of aqueous solutions than either Type I or Type II microemulsions. It is not necessary that the composition be adjusted to form the desired Type III microemulsion, but it is considered that the surfactant composition is more effective when adjusted to form a Type III microemulsion in the treated area. The microemulsions have better injectivity and propagate through subterranean formations more readily because of their lower interfacial tension and their lower viscosity.

Figure 3:
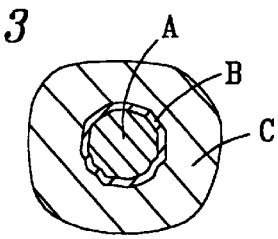
FIG. 3 is a schematic cross-sectional view of a deposit particle containing heavy hydrocarbonaceous materials and a finely divided inorganic particle.

A schematic of a typical particle of the deposits is shown in FIG. 3. The particle comprises an inorganic solid particle nucleus A surrounded by a scale inhibitor or corrosion inhibitor film B and by a layer of oil C. It is believed that, in operations where water and oil are present, and especially when surfactant materials, such as scale inhibitors or corrosion inhibitors are present, the oil which may be heavier hydrocarbonaceous materials may be selectively retained on the particles with the lighter hydrocarbonaceous materials separating more readily for recovery as oil. In any event, a sticky, oily mass of this material is typically produced in oil field operations, is readily transported into, and deposited on, well surfaces such as well lines, downhole apparatus, near wellbore formations and the like, and creates significant operational problems by plugging the wellbore. The use of solvents, such as xylene and diesel oil, frequently fails to remove more than the surface hydrocarbons of such deposits. The surfactant composition of the present invention is much more effective to remove the entire deposit especially when the inorganic particulate particles comprise carbonates.

Figure 4:
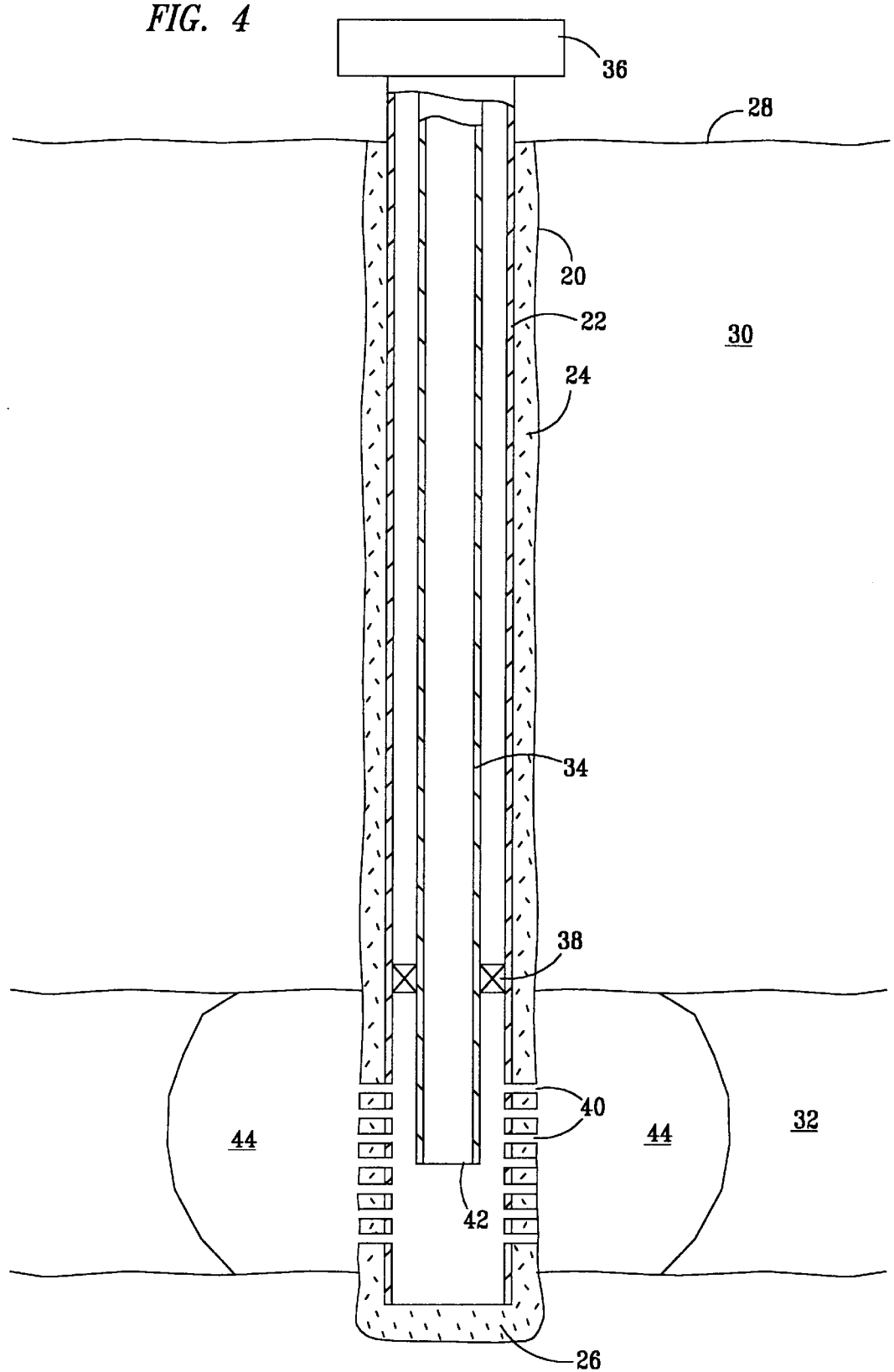
FIG. 4 is a schematic diagram of a water or a water and gas injection well through which water, or alternate slugs of water and gas, are injected into a subterranean formation through a tubing in a casing in the wellbore.

In FIG. 4, a completed well is shown. The completed well can be used either for the injection of fluids or the production of fluids from a subterranean formation. The well comprises a wellbore 20 and includes a casing 22 which is cemented in place in wellbore 20 with cement 24 and extends to a bottom 26 of wellbore 20. The well includes a wellhead 36 at a surface 28, which is adapted for the injection of or production of fluids from the well. A tubing 34 beneath an overburden 30 extends downwardly from wellhead 36 inside casing 22 to a depth 42 near a formation 32 into which fluids are to be injected, or from which fluids are to be produced. Casing 22 has been perforated by perforations 40 in formation 32 to permit the injection or production of fluids. It will be understood that the well may be completed with or without casing through the formation of interest, as known to those skilled in the art. In other words, the well in the formation of interest may be open hole and the injection or production may be directly into or from formation 32. A packer 38 is positioned between tubing 34 and casing 22 to prevent the flow of liquids or gas upwardly between tubing 34 and casing 22.

When the well is used for the injection of a fluid such as water, the water is injected into the well via tubing 34 and flows through tubing 34 and perforations 40 and into formation 32. When produced water, for instance from an oil/gas/water separator, is injected into the well, it has been found that deposits are formed on the inner surfaces of the tubing 34, casing 22 below packer 38, perforations 40, and near wellbore portions 44 of the formation.

These deposits can become a problem in wells which are used only for water injection. The deposits can accumulate to a level sufficient to restrict flow and harbor active sulfate-reducing bacteria and can result in the formation of spots of active bacteria which may result in the formation of pits in tubing 34 which may eventually extend through tubing 34. Accordingly, it is necessary to clean such deposits from tubing 34 periodically and it is also necessary to clean such deposits from the inside of casing 22 below packer 38 and the inside of any open-hole portion of the well extending into or through formation 32. Similarly, such deposits can form in the near wellbore portions 44 of formation 32 and restrict flow into the formation 32. Such deposits can be removed by a method consisting essentially of injecting the aqueous surfactant composition described above into tubing 34 in an amount sufficient to substantially fill tubing 34 and portions of the well in fluid communication with the tubing. The aqueous surfactant composition is then held in place by maintaining pressure on tubing 34. Generally, formation 32 will have sufficient pressure to prevent the flow of the surfactant composition into formation 32 under the hydrostatic pressure in the well. The aqueous surfactant composition is desirably maintained in the tubing and wellbore for a suitable period of time which typically is at least 1 hour, frequently is from about 1 to about 4 hours and, in many instances, is about 3 hours. Longer times may be used if necessary for thicker deposits and the like. After the time period, the surfactant solution may be flushed into subterranean formation 32 by injecting an aqueous solution such as water, brine or the like, through tubing 34. Alternatively, an amount of water or brine may be injected sufficient to push a portion of the surfactant composition into formation 32 in zone 44, by pushing from about ½ to about ¾ of the aqueous surfactant composition in the well into the formation by the injection of a limited amount of water or brine. This solution may then be held in the formation for a second period of time comparable to the first period of time to remove deposits from perforations 40 and near wellbore formation 44. The aqueous surfactant composition may then be flushed into the surrounding formation 32 by resumption of water injection through tubing 34. Repeated treatments may be used if necessary.

When the well is used for alternate water and gas injection, the well is desirably treated as discussed above immediately prior to the resumption of gas injection. The treatment is basically the same as described above, except that after a short period of water injection to flush the surfactant composition into the surrounding formation, gas injection is commenced.

It has been found that in the absence of such treatment, the deposits tend to dry during gas injection and crack and fall from the tubing and casing walls into the lower portion of the wellbore and may, in some instances, accumulate to a sufficient depth to plug perforations 40. The deposits can accumulate to a substantial depth and may cover the perforations even when multiple injection zones are used. The practice of the method described above has been found effective to remove such deposits from the tubing and other well surfaces so that operations can be continued without formation plugging, tubing failure and the like.

When deposits have accumulated in the bottom of the well to a depth which can be contacted with the surfactant composition as discussed above, they may be removed by the same steps described above. It may be necessary in such instances to use longer time periods to permit the surfactant composition to dissolve the deposits in the lower portion of the wellbore since it is more difficult to achieve intimate contact with the deposits when the deposits are present to a substantial depth. In any event, it has been found that the use of the method described above is sufficient to remove deposits which have accumulated to a depth which may be contacted with the surfactant composition in the bottom of a wellbore. It may be necessary in some instances to repeat the treatment, especially if perforations are available above the top of the solids accumulation to receive fluids.

Alternatively, the well shown in FIG. 4 may be used for the production of fluids from formation 32. The fluids flow from formation 32 into wellbore 20 and, if sufficient formation pressure is present, to the surface 28 via tubing 34 for recovery as known to those skilled in the art. If insufficient pressure is present in formation 32, the fluids may be pumped to surface 28 via a pump (not shown) through tubing 34. Similar deposits may be encountered in producing wells and may be removed as described above. The deposits encountered in producing wells may comprise finely divided particulates coated with surface active production treatment chemicals such as scale inhibitors or corrosion inhibitors and heavy hydrocarbonaceous materials.

Such deposits may be encountered during producing well operations. For instance deposits may be encountered in gravel packs or in the near wellbore formation. Such deposits may comprise formation particulates mixed with heavy hydrocarbonaceous materials and production treatment chemicals from the fluids injected during installation of the gravel pack, during fracturing operations, scale inhibitor treatments and the like. The origin of the deposits in many instances is less well-known than the fact of their presence and their impact on wellbore operations. Such deposits are readily removed by the methods described above.

Figure 5:
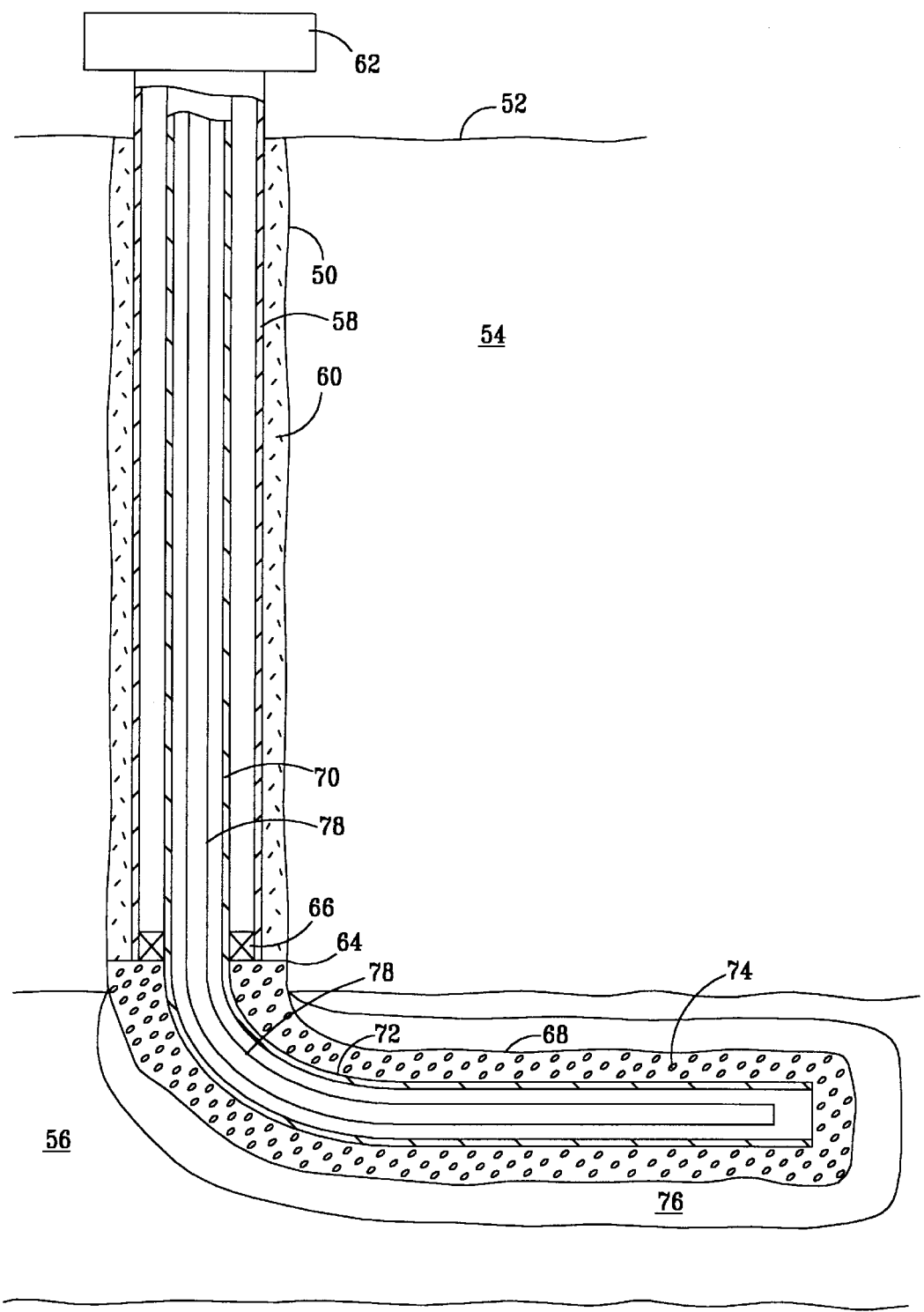
FIG. 5 is a schematic diagram of an oil production well.

In FIG. 5 a horizontal oil production well is shown. It will be understood that oil production refers to the production of fluids which contain oil, but which may comprise oil, gas, water and mixtures thereof. Well 50 extends from a surface 52 through an overburden 54 and into an oil-bearing formation 56. Well 50 is cased with a casing 58 which is cemented in place by cement 60. Casing 58 extends to a depth 64. A tubing 70 extends from a wellhead 62 through casing 58 and extends beyond the bottom 64 of casing 58 into a horizontal portion of well 50. Tubing 70, for at least a portion of its length below the bottom of casing 64, may be formed as a slotted liner, perforated tubing or a screen for the production of fluids from formation 56 in the horizontal portion of well 50. As shown, a packer 66 is positioned to prevent the flow of fluids upwardly between the outside of tubing 70 and the inside of casing 58. A gravel pack 74 may be positioned around the portion of tubing 72 extending into the horizontal portion of well 50. As indicated previously, the portion of tubing 70 extending into the horizontal portion of well 50 is desirably a perforated section of tubing and may comprise a screen. The gravel pack, as shown, may extend to the bottom of casing 64. Such completions may be used when formation 56 consists of friable or unconsolidated sand. The configuration of gravel packs can vary widely and in many instances gravel packs are specifically installed to cover a section of perforations or other smaller section of the well. It will be noted that well 50 has been completed open hole in the horizontal portion.

During the production of fluids from such wells, it has been found that in some instances plugging can occur in the gravel pack, in the near wellbore portion of the formation 56 or the like. The deposits found in such plugs are similar to those discussed above. These deposits are desirably removed by the procedures discussed above. In FIG. 5, a coiled tubing 78 is shown positioned through tubing 70 and extending to near the end of a screened portion 72 of tubing 70. Such deposits are suitably cleaned from wells such as well 50 by injecting the aqueous surfactant composition of the present invention into the well through coiled tubing 78 and maintaining the aqueous surfactant composition in place in well 50 for a suitable period of time. The aqueous surfactant composition may be used either by maintaining it in position for a period of time and then injecting it into the near wellbore formation or, in the event that the deposits have not been fully removed, the aqueous surfactant composition may be circulated out of the well to remove particulates, spent solution and the like. In any event it is desirable, when the deposits have been removed so that injectivity has been restored, that the aqueous composition be injected into the near wellbore formation 76 and retained in position in the near wellbore formation until deposits have been dissolved and removed from the near wellbore formation. Many variations are possible within the scope of the present invention with respect to the methods for contacting the deposits with the aqueous composition.

In some instances, it may be desirable to use an inert gas to create turbulence and an aqueous surfactant composition foam. In such instances the aqueous surfactant composition and a suitable inert gas such as nitrogen, carbon dioxide and the like may be injected alternately into the zone to be treated, or a foam may be formed at the surface, in an injection tubing, in-situ or the like.

In some instances it may be desirable to recover the aqueous surfactant composition after dispersion of the deposits from the wellbore. The surfactant composition may be recovered as known to those skilled in the art. For instance, the aqueous surfactant composition may be injected into the zone of interest via a coiled tubing string positioned through the tubing with the surfactant composition being displaced from the zone of interest after a selected time period to the surface by the injection of additional fluid through the coiled tubing and the like. Foamed aqueous surfactant composition can be similarly displaced to the surface. Foamed aqueous surfactant composition is preferred for wells where the hydrostatic head created by the aqueous surfactant composition in the wellbore may exceed the formation pressure or for fluid diversion purposes It may be desirable when foamed aqueous surfactant is used to add a suitable cationic fluorocarbon surfactant such as fluorinated alkyl quaternary ammonium chloride or iodide in the range from about 0.02 to about 2.0 weight percent and preferably from about 0.1 to about 1.0 weight percent.

Figure 6:
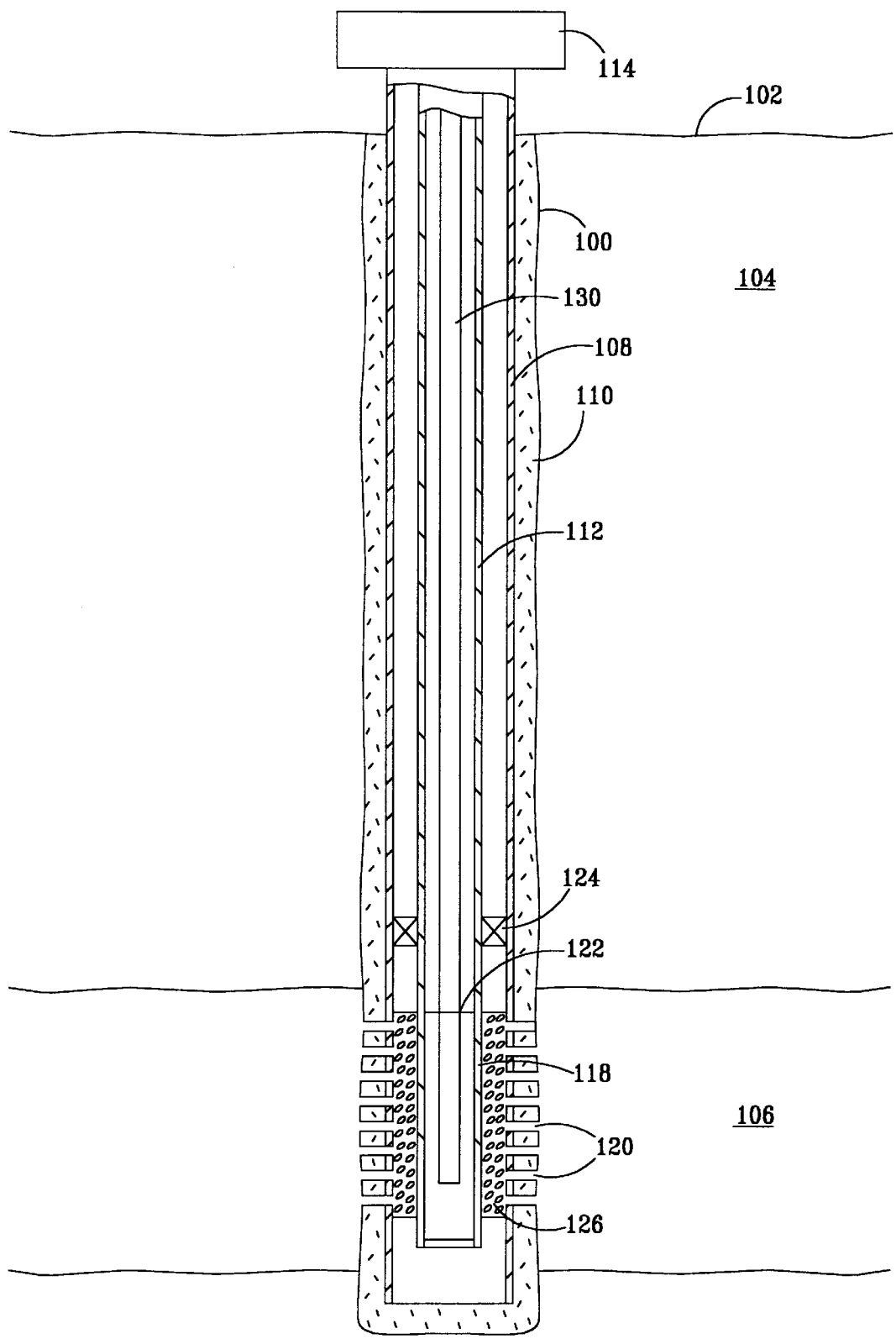
FIG. 6 is a schematic diagram of an oil production well of the type treated in Example 1.

In FIG. 6 a producing well is shown. Well 100 extends from a surface 102 through an overburden 104 and through a producing formation 106. Wellbore 100 includes a casing 108 which is cemented in place by cement 110 to the bottom of producing formation 106. Wellbore 100 also contains a tubing string 112 inside casing 108. Tubing string 112 extends to near the bottom of producing zone 106 and in a lower portion 118 comprises a screen section 118. The screen section extends through a gravel pack 126 which covers perforations 120 which provide fluid communication between tubing 112 and formation 106. A packer 124 is positioned to prevent the flow of fluids upwardly between the outside of tubing 112 and the inside of casing 108.

In the operation of the well in FIG. 5, fluids are produced by a flow of fluids from formation 106 through perforations 120, gravel pack 126, screen portion 118 and upwardly through tubing 112 for production at a wellhead 114.

In some formations and in some wells, it may be desirable to include at least one of a corrosion inhibitor such as a quaternary amine, or a clay stabilizer such as ammonium chloride or an iron reducing agent such as eryphorbic acid.

The aqueous surfactant composition of the present invention is effective generally to remove deposits of inorganic particulates and heavy hydrocarbonaceous materials by contacting the deposits with the aqueous surfactant composition by any suitable means for contacting the deposit.

Having thus described the present invention by reference to certain of its preferred embodiments, it is pointed out that many variations and modifications are possible within the scope of the present invention. Many such variations and modifications may be considered obvious and desirable by those skilled in the art based upon the foregoing description of preferred embodiments.

I claim:

1. A method for removing deposits comprising heavy hydrocarbonaceous materials and finely divided inorganic particulate materials from a well, the method comprising:
    a) injecting an aqueous surfactant composition comprising an aqueous solution containing:
        1) an acidic material consisting of about 0.1 to about 30.0 weight percent of an organic acid selected from the group consisting of acetic, formic, propionic and citric acids or about 0.5 to about 15.0 weight percent of hydrochloric acid;
        2) about 0.25 to about 10.0 weight percent of an alkyl polyglycoside surfactant selected from alkyl polyglycosides containing alkyl groups containing from about 9 to about 16 carbon atoms and mixtures thereof;
        3) about 0.25 to about 10.0 weight percent of an ethoxylated alcohol selected from the group consisting of ethoxylated alkyl alcohols containing from about 6 to about 16 carbon atoms in the alkyl alcohol and from about 2.5 to about 6 ethylene oxide groups and mixtures thereof; and,
        4) about 0.1 to about 6.0 weight percent of at least one alkyl alcohol containing from about 4 to about 8 carbon atoms;
    b) retaining the aqueous surfactant composition in the well for a selected time period; and
    c) injecting an aqueous solution into the well.

2. The method of claim 1 wherein the selected time period is from about 1 to about 4 hours.

3. The method of claim 1 wherein a sufficient quantity of an aqueous solution is injected into the well to displace a portion of the aqueous surfactant composition into a subterranean formation in fluid communication with the well.

4. The method of claim 3 wherein the portion is from about one-half to about three-fourths of the aqueous surfactant composition.

5. The method of claim 3 wherein the aqueous surfactant solution is maintained in the subterranean formation for a second selected time period.

6. The method of claim 5 wherein the second selected time period is from about 1 to about 4 hours.

7. The method of claim 5 wherein an aqueous solution is injected into the well after the second selected time period to move the aqueous surfactant composition from the well and into the subterranean formation.

8. A method for removing deposits comprising heavy hydrocarbonaceous materials and finely divided inorganic particulate solids from a well, the method comprising:
    a) injecting an aqueous surfactant composition comprising an aqueous solution containing:
        1) an acidic material consisting of about 0.1 to about 30.0 weight percent of an organic acid selected from the group consisting of acetic, formic, propionic and citric acids or about 0.5 to about 15.0 weight percent of hydrochloric acid;
        2) about 0.25 to about 10.0 weight percent of an alkyl polyglycoside surfactant selected from alkyl polyglycosides containing alkyl groups containing from about 9 to about 16 carbon atoms and mixtures thereof;
        3) about 0.25 to about 10.0 weight percent of an ethoxylated alcohol selected from the group consisting of ethoxylated alkyl alcohols containing from about 6 to about 16 carbon atoms in the alkyl alcohol and from about 2.5 to about 6 ethylene oxide groups and mixtures thereof; and,
        4) about 0.1 to about 6.0 weight percent of at least one alkyl alcohol containing from about 4 to about 8 carbon atoms;
    b) retaining the aqueous surfactant composition in the well for a selected time period; and
    c) producing the aqueous surfactant composition from the well.

9. A method for removing deposits comprising heavy hydrocarbonaceous materials and finely divided inorganic material from a flowline, the method comprising:
    a) injecting an aqueous surfactant composition comprising an aqueous solution containing:
        1) an acidic material consisting of about 0.1 to about 30.0 weight percent of an organic acid selected from the group consisting of acetic, formic, propionic and citric acids or about 0.5 to about 15.0 weight percent of hydrochloric acid;
        2) about 0.25 to about 10.0 weight percent of an alkyl polyglycoside surfactant selected from alkyl polyglycosides containing alkyl groups containing from about 9 to about 16 carbon atoms and mixtures thereof;
        3) about 0.25 to about 10.0 weight percent of an ethoxylated alcohol selected from the group consisting of ethoxylated alkyl alcohols containing from about 6 to about 16 carbon atoms in the alkyl alcohol and from about 2.5 to about 6 ethylene oxide groups and mixtures thereof; and,
        4) about 0.1 to about 6.0 weight percent of at least one alkyl alcohol containing from about 4 to about 8 carbon atoms;
    b) retaining the aqueous surfactant composition in the flowline for a selected time period; and,
    c) flowing an aqueous solution through the flowline to remove the aqueous surfactant composition and dissolved deposits.

10. The method of claim 9 wherein the selected time period is from about 1 to about 4 hours.

* * * * *